United States Patent
Bullis et al.

(10) Patent No.: US 10,496,663 B2
(45) Date of Patent: Dec. 3, 2019

(54) SEARCH JOURNALING FOR OPERATIONS ANALYSIS

(71) Applicant: International Business Machines Corporation, Armonk, NY (US)

(72) Inventors: Paul K. Bullis, Cedar Park, TX (US); Geoffrey M. Hambrick, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 345 days.

(21) Appl. No.: 15/184,641

(22) Filed: Jun. 16, 2016

(65) Prior Publication Data

US 2017/0364566 A1    Dec. 21, 2017

(51) Int. Cl.
*G06F 16/248*     (2019.01)
*G06F 16/18*      (2019.01)
*G06F 16/22*      (2019.01)

(52) U.S. Cl.
CPC ........ *G06F 16/248* (2019.01); *G06F 16/1805* (2019.01); *G06F 16/2246* (2019.01)

(58) Field of Classification Search
CPC ......... G06F 17/30194; G06F 17/30327; G06F 17/30554; G06F 8/4441; G06F 16/904; G06F 16/93; G06F 16/954; G06F 16/2246; G06F 16/951; G06F 16/24; G06F 16/248; G06F 16/245; G06F 16/242; G06F 16/2423; G06F 16/2462; G06F 16/332; G06F 16/3334
See application file for complete search history.

(56) References Cited

U.S. PATENT DOCUMENTS

| | | | |
|---|---|---|---|
| 8,577,865 B2 | 11/2013 | Elsaesser et al. | |
| 9,195,759 B2 | 11/2015 | Faitelson et al. | |
| 2003/0204515 A1* | 10/2003 | Shadmon | G06F 17/3061 707/999.1 |
| 2005/0102202 A1* | 5/2005 | Linden | G06Q 30/02 705/26.7 |
| 2006/0031206 A1 | 2/2006 | Deubel et al. | |
| 2010/0100543 A1* | 4/2010 | Brady | G06F 17/30613 707/732 |

(Continued)

OTHER PUBLICATIONS

Sharma; A method of filtering web search results based on recent system activity of a user, Feb. 2, 2012.

(Continued)

*Primary Examiner* — Yuk Ting Choi
(74) *Attorney, Agent, or Firm* — Garg Law Firm, PLLC; Rakesh Garg; William Hartwell

(57) ABSTRACT

A session initiation with an information system is detected, the session including a search for a data item in the information system. In an application executing using a processor and a memory, a node is constructed in a search tree, the node representing a search-related step occurring in the session. The node is configured with at least a search term used in the search and a context within which the search is performed using the search term. The node is positioned relative to a second node in the search tree, where the second node corresponds to a second search that was performed prior to the search in the session. The search tree is output as a part of a search journal corresponding to the session.

20 Claims, 5 Drawing Sheets

(56) References Cited

U.S. PATENT DOCUMENTS

2010/0114916 A1* 5/2010 Cooke ................ G06F 16/954
707/752
2010/0241351 A1 9/2010 Meisels et al.
2013/0191317 A1* 7/2013 Perron .................... G06N 5/00
706/50
2016/0299910 A1* 10/2016 Mokbel ............ G06F 17/30241
707/732

OTHER PUBLICATIONS

Anonymous; System and Method for Triggering Social Activity Based Automated Search and Campaigns, Feb. 26, 2014.
Anonymous; Method and System for Providing a Smart Search Engine that Incorporates User's Behavior and Search Results, Mar. 21, 2014.

* cited by examiner

SEARCH JOURNALING FOR OPERATIONS ANALYSIS

TECHNICAL FIELD

The present invention relates generally to a method, system, and computer program product for tracking and managing searches. More particularly, the present invention relates to a method, system, and computer program product for search journaling for operations analysis.

BACKGROUND

Hereinafter, a "search" is an electronic searching operation performed by an application into data managed by or accessible from an information system unless expressly disambiguated where used. The searching operation can be configured in any manner suitable for the given implementation of the information system, e.g., according to the data being searched, the organization of the data in the information system, the search interface or method implemented by the information system, and the like.

For example, when the information system is a database, the search is configured according to a query language supported by the database; when the information system is a product catalog, e.g. as in the case of an online retailing website, the search may be a natural language search term input; or when the information system is a task management system, the search may be constructed using a combination of parametric terms and/or natural language terms pertaining to a task being searched. Generally, any type of data can be searched in any type of information system, using a search operation that of any suitable configuration.

Typically, when a search is performed, a result set is returned in response to the search. The result set includes references to one or more data items that satisfy the search criteria. Under certain circumstances, a result set can also be empty, e.g., when no data item satisfies the search criteria.

The term "data item" is interchangeably referred to herein as an "item" unless expressly distinguished where used. A data item is data that represents a searchable product, service, or value offered by an information system. The product, service, or value can be physical or virtual, may actually exist as is or may be derived from one or more other products, services, or values, or the data thereof.

If a user, e.g., the searcher who is performing the search, selects an item for further use, the reference to the data item is saved in a referencing item or a container item. A referencing item or a container item is also interchangeably referred to herein as a container. A container item is a data structure used to hold references to data items.

To give a specific non-limiting example, a user may visit an online retailing website to look for a product. The user performs a search in the website's catalog, which is populated with data items representing the products offered by the website. When the user searches for widget ABC, the search returns a result set of all data items related to matching products from the catalog. If the user selects a product by selecting a corresponding data item from the result set, the selected data item is saved in one or more containers, e.g., in a shopping cart, in a recently viewed list, in a list containing products or product-categories of interest to the user, and other well-known containers.

As another example, a customer facing a problem in a data processing environment opens a trouble ticket. The trouble ticket is an example of a container item. The customer searches product documentation, support data, user forums and other repositories of data items available in an information system of the data processing environment. The portions of product documentation tried by the customer, support data links visited, forum postings reviewed, are all examples of data items that become referenced in the trouble ticket container.

A container with the references to the data items contained therein can be persisted. In other words, presently, a container, e.g., a shopping cart or a trouble ticket, can remain populated with the referenced data items and can remain available for a period of time regardless of the state of the searching session. The persisted container is useful to the user if or when the user returns to resume interactions with the information system. The persisted container is also useful to the provider of the information system, e.g., to provide item-specific or container-specific notifications to the user, or to guide a support technician to review the actions already taken by the customer in resolving a problem.

SUMMARY

The illustrative embodiments provide a method, system, and computer program product. An embodiment includes a method that detects initiating a session with an information system, the session including a search for a data item in the information system. The embodiment constructs, in an application executing using a processor and a memory, a node in a search tree, the node representing a search-related step occurring in the session. The embodiment configures the node with at least a search term used in the search and a context within which the search is performed using the search term. The embodiment positions the node relative to a second node in the search tree, wherein the second node corresponds to a second search that was performed prior to the search in the session. The embodiment outputs the search tree as a part of a search journal corresponding to the session.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
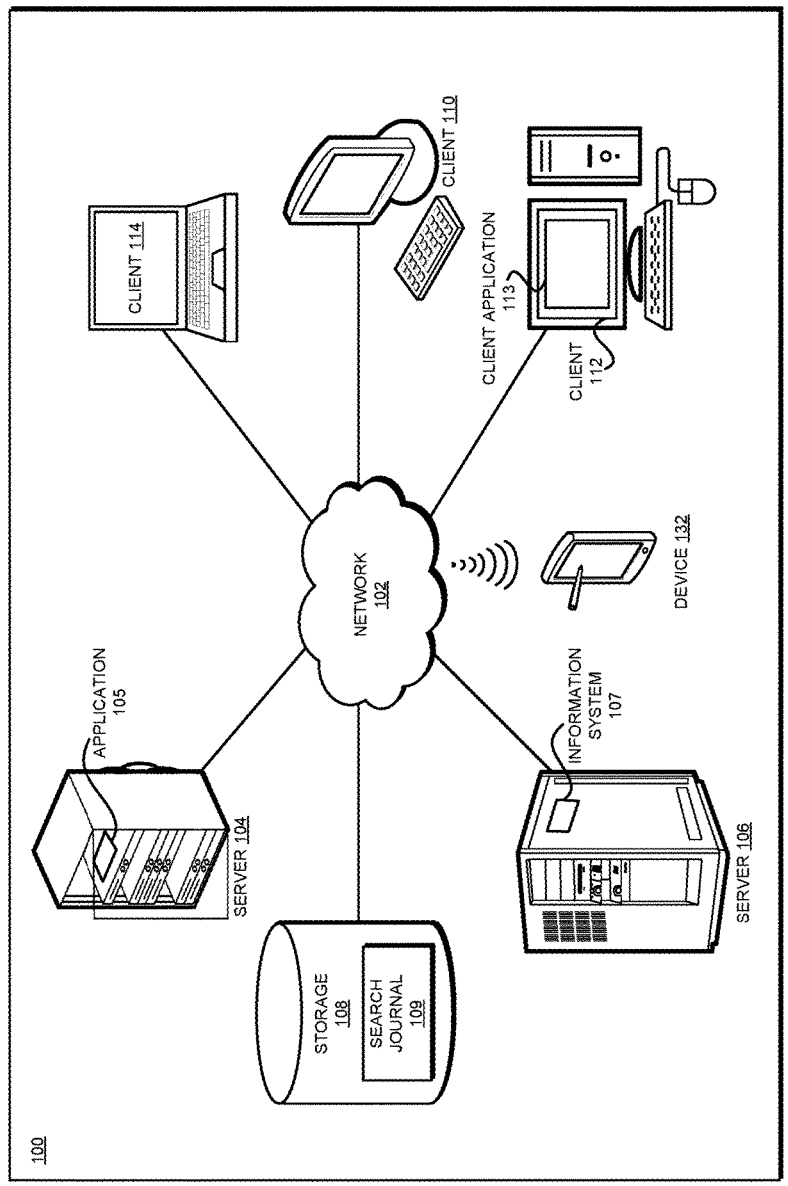
FIG. 1 depicts a block diagram of a network of data processing systems in which illustrative embodiments may be implemented.

The illustrative embodiments recognize that persisting a container item with references to data items is insufficient or unsuitable in many circumstances. For example, in many cases, the persisted container is a snapshot in time, i.e., the container includes references to the items that were available at a point in time when the container was persisted. The references in the persisted container can become stale, the referenced data items can move or change, new data items added after the search and which could have matched a search criterion cannot be referenced in the container, and many other problems can reduce the utility of the persisted containers.

Even when a persisted container can be updated, as some presently available shopping cart implementations do, very limited modifications to the persisted containers are possible in such cases. For example, presently a shopping cart can be updated to remove items whose references have become stale from passage of time or reduction in inventory, or a shopping cart can be updated with an updated parameter (e.g., applicable price or discount) of a referenced item, or an update can be associated with a referenced item (e.g., a support technician's notes in reference to a support article referenced in a ticket container) but not much else can be done with the persisted container.

The illustrative embodiments recognize that persisting a container provides no visibility into a search process that was used by the user to arrive at any particular state of the container. For example, a user may search for one type of items, perform several searches exploring various items of the type, perform another search for another type of item, and leave without selecting any item into a container. Presently available method of persisting a container will only show an empty container. The container provides no information or insight into the user's thought process in performing the search. I.e., from reviewing the persisted container, one cannot analyze a reason why the user did not select any items into the container.

It may be that the user did not find what the user was looking for, or it may be that the items of interest were buried too deep into the search results, or it may be that the type of item searched for did not include an item that belongs in the type but is not assigned to that type in the catalog. As can be seen, many reasons can be responsible for a particular state of the container. The illustrative embodiments recognize that simply retaining or persisting the state of the container is insufficient or unsuitable for determining the reason for the state, and many other analytic operations.

For example, an analytic operation may want to analyze the search sequence used by the user to optimize the catalog organization or to optimize item suggestions or ranking in response to a search. The illustrative embodiments recognize that merely persisting a particular snapshot state of a container provides insufficient information for performing this and many other types of analytical exercises.

The illustrative embodiments used to describe the invention generally address and solve the above-described problems and other problems related to enabling the analysis of a searching operation.

An embodiment can be implemented as a software application. The application implementing an embodiment can be configured as a modification of an existing information system, as a separate application that operates in conjunction with an existing information system, a standalone application, or some combination thereof.

A search journal is a record of a series of search-related steps performed in a searching operation. Search journaling is a process of constructing the search journal from a session that includes one or more searches on a searching operation. A search-related step includes constructing or configuring a search—e.g., the initiation of a session with an information system for performing a search, organizing the search terms in a suitable manner, navigating towards or away from an item in the result set of a search, reaching an item in the result set, selecting an item in the result set, navigating away from a selected item or a result set—e.g. to construct another search or to close the session, navigating back or backtracking to a previously performed search or a previously obtained result set, and the like.

These examples of search-related steps are not intended to be limiting. From this disclosure, those of ordinary skill in the art will be able to conceive many other search-related steps and the same are contemplated within the scope of the illustrative embodiments.

A search journal saves or stores a series of search-related steps with temporal information in a tree structure. In other words, even though the search-related steps occur are sequenced linearly in time, the search journal stores the steps in a tree-like manner where the information about the search-related steps form nodes in one or more branches of the tree. For example, a series of nodes form a tree branch that was pursued during a session, or a branch or a portion thereof that was retraced, traced back to follow another branch, abandoned to start another branch or another tree.

A search journal can have a tree with any number of branches, and any number of such trees. The information in a node of a branch of a tree is sufficient to provide (i) information about a temporal order of the node relative to other nodes or the root a tree, (ii) the contents and/or configuration of the search, and (iii) contextual information (context) used for performing that search.

A context of a search includes any suitable combination of—information that is related to the user performing the search—e.g. a user's profile or preferences; time and place of performing the search; a history of searches performed by the user; a previously created search journal associated with a previous search of the user; a similar search by a different user; a different search by a similar user; end result of a previous search—e.g., a completed sale transaction or a final selection for a purpose, or an abandoned transaction or final selection; and many other search or user-related data artifacts.

An embodiment detects an initiation of a session in which a search is likely to be performed. The embodiment opens a search journal relative to the session. The embodiment can be configured to open a search journal with each session without determining whether a search is likely to be performed in the session.

The embodiment detects a search-related step in the session. The embodiment constructs an entry for the search-related step in a search tree in the journal. For example, the embodiment inserts a node, which includes the information corresponding to the step as described herein, in a suitable location in a suitable branch of the tree.

The embodiment continues to create journal entries and adding nodes to one or more trees in the journal in this manner. The embodiment detects an end, termination, or other conclusion of the session. In response to the end, termination, or other conclusion of the session, the embodiment closes the journal.

An embodiment makes the search journal available for analysis. For example, in one example analysis, one portion of the journal can be analyzed using one analytical technique and another portion of the journal can be analyzed using another analytical technique.

In another example analysis, a journal or a portion of a journal that produces a certain result is weighted according to the result produced. As a non-limiting example, in such an analysis, a tree or a branch that was abandoned or did not result in a completed transaction is given more weight than a tree or a branch that did result in a completed transaction.

A method of an embodiment described herein, when implemented to execute on a device or data processing system, comprises substantial advancement of the functionality of that device or data processing system in gaining useful insight into a search process used by a user, such as to improve the efficiency or effectiveness of the search facility, improve or change the offering or arrangement of searchable data items, improve a rate of desirable conclusions of the search activity, or to achieve some combination of these and other desirable results. For example, presently available methods for providing search results are limited to providing persisted containers and stale references to the data items references, linked, or otherwise contained therein. Even keeping a persisted container current only updates the referenced data items but provides no visibility into the search process that led to the creation of the container and the references therein. Where prior art allows the user to explicitly persist a single search for replay, such features do not persist the entire session of search steps in a tree like structure, or store each search with their respective operational contexts. An embodiment associates a search journal with a session at the beginning of the session. The embodiment records all or a selected subset of search-related steps in the form of one or more trees. During analysis, a tree can be traversed to reveal a sequence in which the search-related steps were performed during the session. This manner of search journaling for operations analysis is unavailable in the presently available methods. Thus, a substantial advancement of such devices or data processing systems by executing a method of an embodiment is in improving the efficiency or effectiveness of the search facility, improving the offering or arrangement of searchable data items, improving a rate of desirable conclusions of the search activity, and achieving other similarly purposed desirable results.

The illustrative embodiments are described with respect to certain types of data items, container items, information systems, sessions, searches, search-related steps, tree structures, node contents, contextual information, conclusions, analyses, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
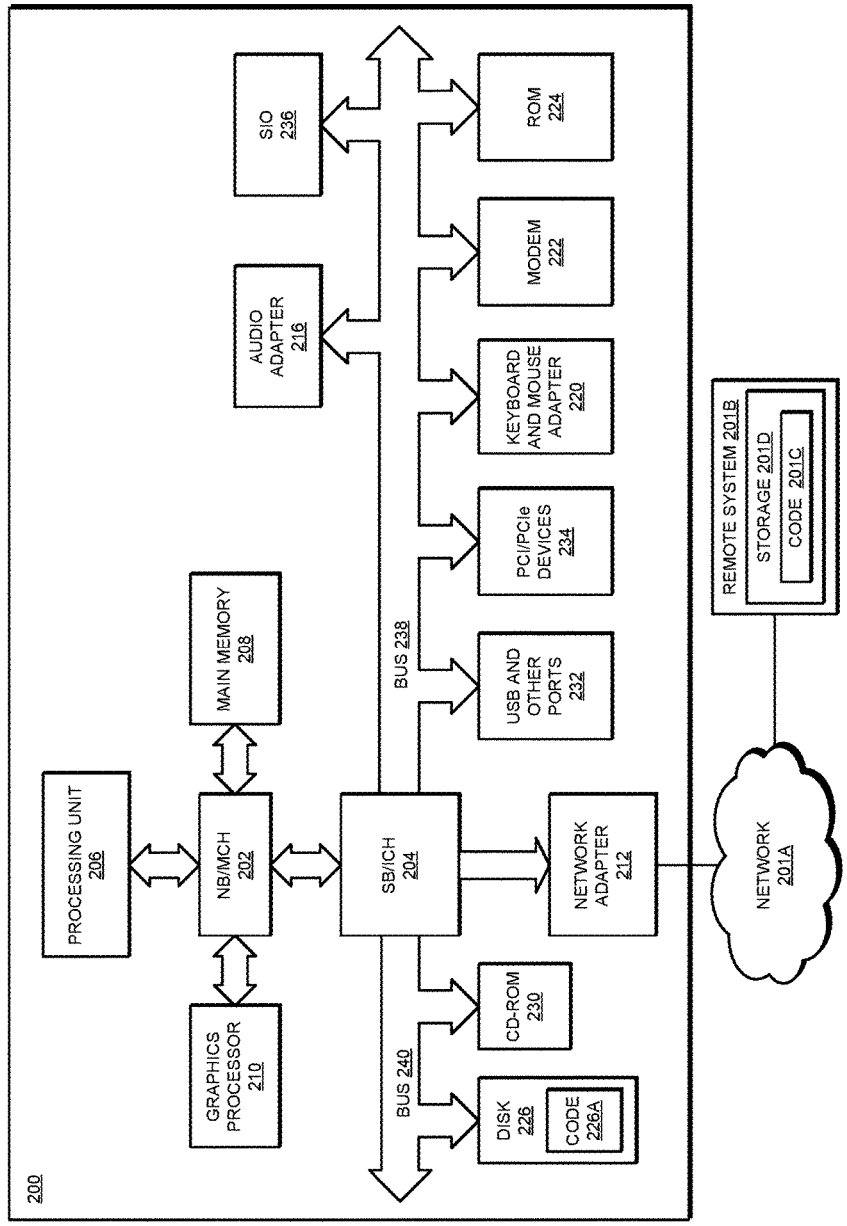
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 creates and populates search journal 109 for a session created from client application 113 for searching data items offered by information system 107, in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
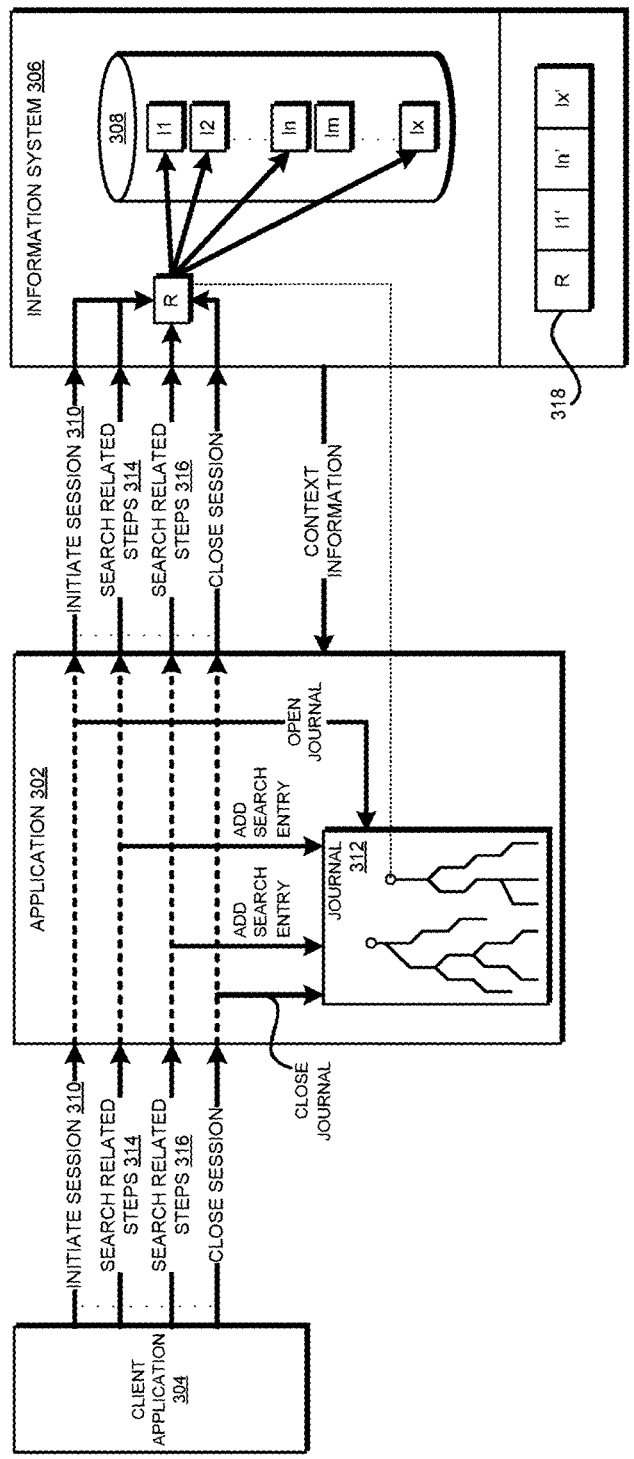
FIG. 3 depicts a block diagram of an example configuration for search journaling for operations analysis in accordance with an illustrative embodiment.

With reference to FIG. 3, this figure depicts a block diagram of an example configuration for search journaling for operations analysis in accordance with an illustrative embodiment. Application 302 is an example of application 105 in FIG. 1. Client application 304 is an example of client application 113 in FIG. 1. Information system 306 is an example of information system 107 in FIG. 1.

Information system 306 maintains, or has access to, repository 308 of data items. Any number of data items are included in repository 308 in the manner of data items I1, I2, . . . In, Im, . . . and Ix. Any number of repositories similar to repository 308 can be used in a similar manner.

In operation 310, client application 304 initiates a session with information system 306. Application 302 senses the initiation of the session and constructs or opens search journal 312 relative to the session. Application 302 allows session initiation operation 310 to pass to information system 306.

Suppose that information system 306 is configured to create container item "R" when a session is initiated, such as in response to operation 310. Container R may be a new container or a previously existing container.

Client application 304 performs any number of search-related steps 314-316 in any order or sequence suitable for the user of client application 304. Application 302 can be configured to create journal entries in journal 312 only for certain types of search-related steps, or all types of search-related steps, as may be suitable for information system 306. For example, one implementation of an embodiment may configure application 302 such only those types of steps in which the search is configured, selecting an item in the result set, and navigating away from a result set to construct another search or to close the session, occurs result in the creation of a journal entry. Another example implementation of an embodiment may configure application 302 such that all types of search-related steps, including constructing or configuring a search, organizing the search terms, navigating towards or away from an item in the result set, reaching an item in the result set, selecting an item in the result set, navigating away from a selected item or a result set, and backtracking to a previously performed search or a previously obtained result set, and the like, each results in the creation of a journal entry.

Thus, depending upon the implementation, application 302 adds journal entries to journal 312 corresponding to all or some of search-related steps 314-316. Application 302 allows all search-related steps 314-316 to pass unaffected to information system 306 for appropriate processing.

As an example, suppose that in response to some search-related steps 314-316, information system 306 associates links or references to items I1, I2, In, and Ix with container R. This could occur, for example, when the user of client application 304 selects the products, services, or values represented by data items I1, I2, In, and Ix from one or more result sets.

Presently, container R can be persisted in information system 306 as object 318, which suffers from the limitations and disadvantages described herein. Persisted object 318 includes a reference to R, and references I1', I2', In', and Ix'—each of which could be a pointer, a resource locator, or another suitable manner of referencing data items I1, I2, In, and Ix, respectively, at a point in time when object 318 is saved as a snapshot.

Eventually, the session between client application 304 and information system 306 closes or ends. It is not necessary for client application 304 to expressly close (shown) the session although it is possible to do so. Session closing can simply be a timeout (not shown) configured in application 302, or may be initiated by information system 306 (not shown).

Regardless of how it is brought about, closing of the session causes application 302 to close journal 312. Journal 312 with one or more trees of search-related steps can be made available for analysis while journal 312 is open or after closing journal 312, depending upon the implementation.

In one embodiment, search journal 312 as a whole, or a search tree constructed therein, can be configured to maintain a reference to container R as indicated by the dotted line from a search tree to container R in this figure. This manner of referencing enables an ability to use a tree in the "forest" of search trees that make up a journal as a virtual relationship between a container R and the data items from the repository that are referenced in the container. This manner of virtual referencing using a search tree does not require hard links—or links computed and established as a snapshot in time—to be established between the container item and the items referenced therein.

For example, a relationship in a prior art object oriented database, requires actual references to be created and maintained in a source object. Similarly, in a prior art relational database as well, tables with columns that represent foreign keys must be stored in rows with a primary key associated with a source object.

In contrast, a virtual relationship between container R and a linked item is determined by traversing a search tree, and is resolved whenever the search tree is traversed. For example, the link between container R and item I1 may not be fixedly computed and established when I1 was originally linked with the container, but can be computed again when the search tree is revisited at a later time.

Furthermore, different trees in a given journal can be virtually linked to the same or different container items. For example, search journal 312 may include search tree A, which may be linked to container item A, which has linked items that result from a search for "gifts for Mom". Search tree B in journal 312 may similarly be linked to container item B, which has linked items that result from a search for "gifts for Dad".

Figure 4:
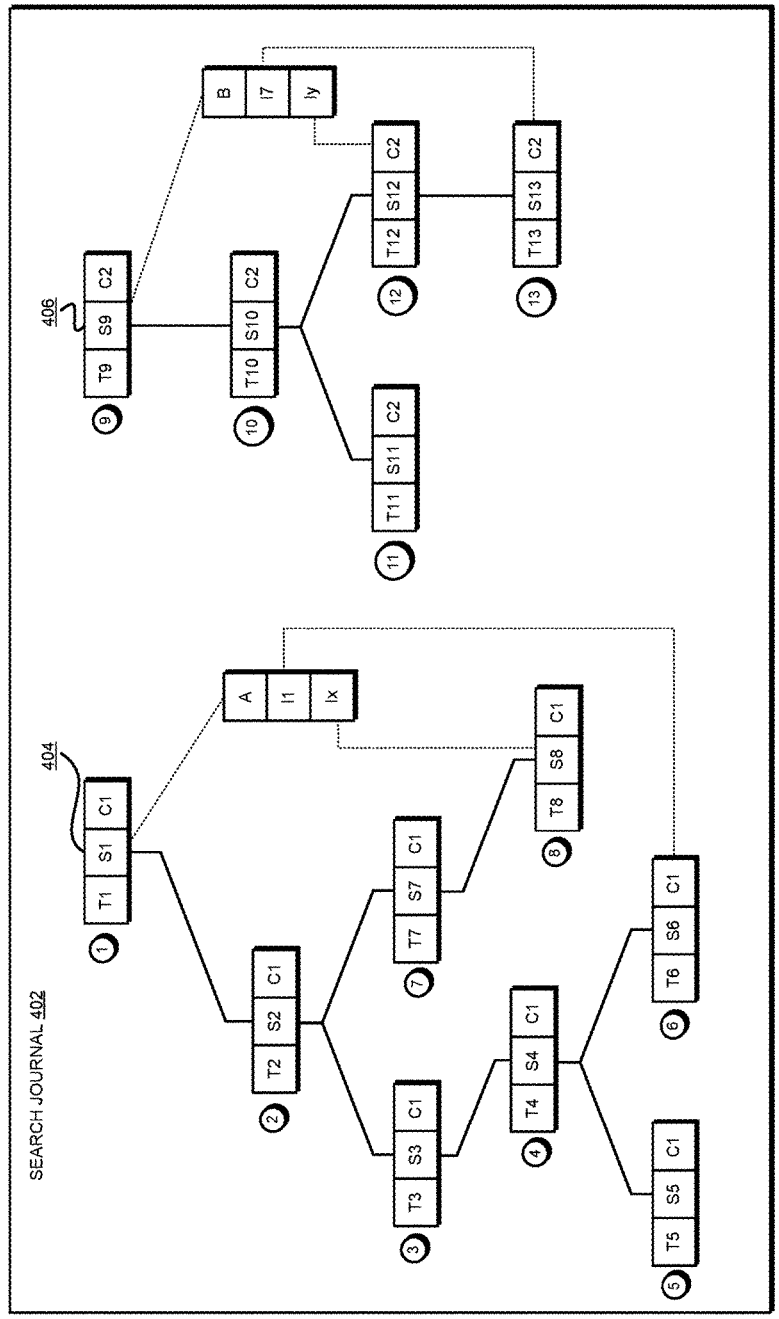
FIG. 4 depicts an example search journal in accordance with an illustrative embodiment.

With reference to FIG. 4, this figure depicts an example search journal in accordance with an illustrative embodiment. Journal 402 is an example of journal 312 in FIG. 3.

Each node in each tree in journal 402 includes three pieces of information. Information "T", e.g., T1, T2, . . . T13 represents information about a temporal order of the node relative to other nodes or the root a tree. Information "S", e.g., S1, S2, . . . S13, represents the contents and/or configuration of the search-related step corresponding to the node. Information "C", e.g., C1, C2, represent the context used for performing the search-related step of that node. Many search-related steps can be performed within the same context, i.e., using the same contextual information. Accordingly, it is possible that more than one node in a tree in journal 402 will share the same context (shown).

As an example, journal 402 is shown to include trees 404 and 406. Only as a non-limiting example, different contexts are shown as applied at different trees. It is possible for the context to change within a tree, or remain unchanged across different trees in journal 402.

An example set of thirteen example search-related steps are mapped into trees 404 and 406. For example, tree 404 begins at node 1, which represents a step performed in temporal order T1, used information S1 within context C1 to perform the step. Thereafter, tree 404 shows that a step corresponding to node 2 was performed in temporal order T2, used information S2 within context C1. Similarly, tree 404 shows that a step corresponding to node 3 was performed in next temporal order T3 with S3 and C1; a step corresponding to node 4 was performed in next temporal order T4 with S4 and C1; and a step corresponding to node 5 was performed in next temporal order T5 with S5 and C1.

Thereafter, a backtracking or another step with a similar consequence was performed to bring the searching operation back to node 4, from where a step corresponding to node 6 was performed in next temporal order T6 with S6 and C1. After T6, a backtracking or another step with a similar consequence was performed to bring the searching operation back to node 2. Thereafter, a step corresponding to node 7 was performed in next temporal order T7 with S7 and C1; and node 7 was followed by a step corresponding to node 8 was performed in next temporal order T8 with S8 and C1.

The "S" information at any node can be configured to also reveal whether the user abandoned that node without selecting a data item or committed to a data item.

As an example, after node 8, assume that the search operation abandons tree 404, or backtracks to a point before node 1. The search operation changes the context to C2 and performs a step corresponding to node 9 in next temporal order T9 with S9 and C2. The performance of the step of node 9 effectively creates new tree 406 in journal 402.

Tree 406 shows that a step corresponding to node 10 was performed in next temporal order T10 with S10 and C2; and a step corresponding to node 11 was performed in next temporal order T11 with S11 and C2.

Thereafter, a backtracking or another step with a similar consequence was performed to bring the searching operation back to node 10, from where a step corresponding to node 12 was performed in next temporal order T12 with S12 and C2; and a step corresponding to node 13 was performed in next temporal order T13 with S13 and C2.

As can be seen, a journal constructed in the example manner of journal 402 provides significantly more information for analysis than persisted object 318 of FIG. 3. Analyses to provide one or more advantages described herein can be performed using the information contained in such a journal.

As described with respect to FIG. 3, a virtual relationship can be formed between a container item and a tree in journal 402. For example, tree 404 is linked to container item A, which links to example data items I1 and Ix. The virtual linking between tree 404 and container A is established at the beginning of tree 404. Additionally, as different nodes in tree 404 cause item links to be associated with container A, those nodes can be virtually linked with those items in that container. For example, a virtual ink from node [T6, S6, C1] into container A is indicative of the fact that node [T6, S6, C1] caused the linking of item I1 with container A. Similarly, a virtual ink from node [T8, S8, C1] into container A is indicative of the fact that node [T8, S8, C1] caused the linking of item Ix with container A.

Because it is possible, although not necessary, that different trees in journal 402 link to different container items, the depicted example also shows that tree 406 is linked to container item B, which links to example data items I7 and Iy. The virtual linking between tree 406 and container B is established at the beginning of tree 406. Additionally, as different nodes in tree 406 cause item links to be associated with container B, those nodes can be virtually linked with those items in that container. For example, a virtual ink from node [T12, S12, C2] into container B is indicative of the fact that node [T12, S12, C2] caused the linking of item Iy with container B. Similarly, a virtual ink from node [T13, S13, C2] into container B is indicative of the fact that node [T13, S13, C2] caused the linking of item I7 with container B.

Figure 5:
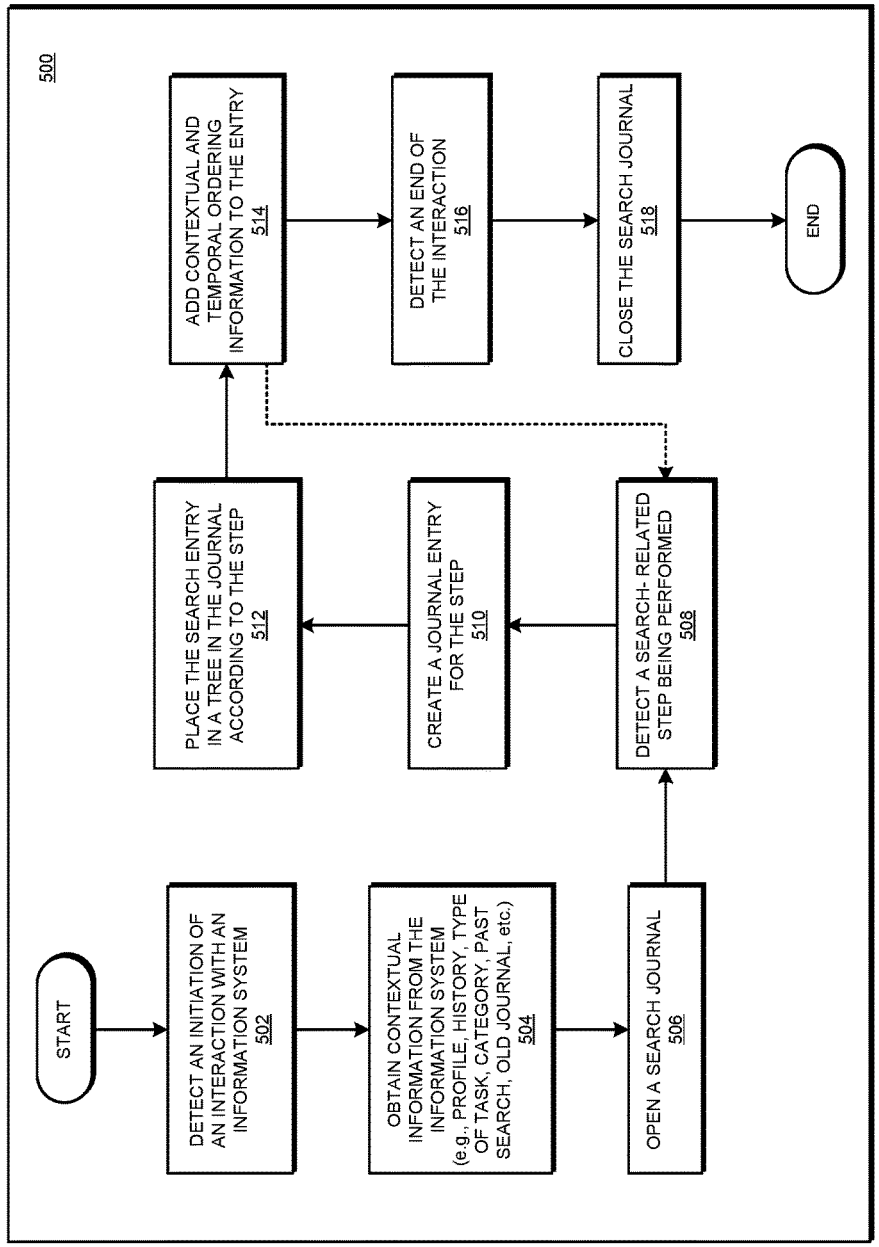
FIG. 5 depicts a flowchart of an example process for search journaling for operations analysis in accordance with an illustrative embodiment.

With reference to FIG. 5, this figure depicts a flowchart of an example process for search journaling for operations analysis in accordance with an illustrative embodiment. Process 500 can be implemented in application 302 in FIG. 3.

The application detects an initiation of an interaction session with an information system (block 502). The application obtains contextual information for the session from the information system (block 504).

The application opens a search journal (block 506). The application detects a search-related step being performed in the session (block 508). The application creates a journal entry for the step in the journal (block 510). The application places the entry in a tree in the journal according to the temporal order and navigation used to perform the step (block 512).

The application adds contextual and temporal ordering information to the entry (block 514). The application repeats blocks 508-514 as many times as any search-related steps, or steps of the configured types—as the case may be—are made in the session.

The application detects an end of the interaction session (block 516). The application closes the search journal (block 518). The application ends process 500 thereafter.

While the illustrative embodiments are described with respect to storing the searches as they were constructed and/or performed, optimization of the searches in the storage is contemplated within the scope of the illustrative embodiments. An embodiment described herein can be adapted to optimize a search and store the optimized search as part of the journal as the session progresses. Such optimization is especially useful during backtracking. when the journal is closed and subsequently reopened, the original sequence or the optimized sequence can be replayed to provide the benefits described herein. When the journal is reopened, editing can be continued, which includes but is not limited to adding an additional search tree, removing an existing search tree, optimizing an existing tree, or pruning or otherwise manipulating an existing search tree.

Thus, a computer implemented method, system or apparatus, and computer program product are provided in the illustrative embodiments for search journaling for operations analysis and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   detecting initiating a session with an information system, the session including a search for a data item in the information system;
   constructing, in an application executing using a processor and a memory, a node in a search tree, the node representing a search-related step occurring in the session;
   configuring the node with at least a search term used in the search and a context within which the search is performed using the search term;
   positioning the node relative to a second node in the search tree responsive to a temporal ordering information corresponding to the search, wherein the second node corresponds to a second search that was performed in the session and prior to the search in the session;
   weighting, using a weighting factor, a portion of the search tree including the node, wherein the weighting factor corresponds to a result of the search-related step, wherein greater weighting is given to one of an incomplete transaction and an incomplete search in comparison to one of a finished transaction and a finished search; and
   outputting the search tree as a part of a search journal corresponding to the session,
   wherein the search tree maintains a virtual relationship to a container within the information system without requiring actual references to be created and maintained.

2. The method of claim 1, further comprising:
   analyzing the search tree to determine a reason for a non-selection of a data item from the information system;
   reorganizing a data item catalog in the information system, such that the reorganizing removes the reason and allows the data item to be selected in response to a second search that uses the search term.

3. The method of claim 1, further comprising:
   constructing a second tree, wherein the tree and the second tree are contained in the search journal, the search journal representing the session, and wherein a node in the second tree uses a second context.

4. The method of claim 1, further comprising:
   adding to the node a temporal ordering information corresponding to the search; and
   using the temporal ordering information in positioning the node relative to the second node in the tree.

5. The method of claim 1, further comprising:
   adding to the node a temporal ordering information corresponding to the search; and
   making the node a root node of the tree responsive to no other search having been performed prior to the search in the session.

6. The method of claim 1, further comprising:
   adding to the node a temporal ordering information corresponding to the search; and
   making the node a root node of the tree responsive to a backtracking operation in the session, wherein the backtracking operation is from a second node in a second tree, the second node corresponding to a second search that was performed prior to the search in the session, and wherein the backtracking operation reaches a state in the session before a root node of the second tree.

7. The method of claim 1, wherein the context comprises a preference used in conducting the search.

8. The method of claim 1, wherein the context comprises a time and place of conducting the search.

9. The method of claim 1, wherein the context comprises a previous search conducted in another session.

10. The method of claim 1, wherein the context comprises a final result of another search.

11. The method of claim 1, wherein the search-related step comprises:
configuring a search query with the search term.

12. The method of claim 1, wherein the search-related step comprises:
navigating one of (i) towards and (ii) away from a data item in a result set of the search.

13. The method of claim 1, wherein the search-related step comprises:
reaching a data item in a result set of the search.

14. The method of claim 1, wherein the search-related step comprises:
selecting a data item in a result set of the search.

15. The method of claim 1, wherein the search-related step comprises:
navigating away from a data item in a result set of the search; and
constructing a different search with a different search term.

16. The method of claim 1, wherein the search-related step comprises:
navigating, in the session, to a state prior to the search, wherein the state comprises a previous search performed in the session.

17. The method of claim 1, further comprising:
constructing a second tree in the search journal, wherein a second branch in the second tree is an optimized form of a first branch in the tree.

18. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

19. A computer usable program product comprising one or more computer-readable storage devices, and program instructions stored on at least one of the one or more storage devices, the stored program instructions comprising:
program instructions to detect initiating a session with an information system, the session including a search for a data item in the information system;
program instructions to construct, in an application executing using a processor and a memory, a node in a search tree, the node representing a search-related step occurring in the session;
program instructions to configure the node with at least a search term used in the search and a context within the search is performed using the search term;
program instructions to position the node relative to a second node in the search tree responsive to a temporal ordering information corresponding to the search, wherein the second node corresponds to a second search that was performed in the session and prior to the search in the session;
program instructions to weight, using a weighting factor, a portion of the search tree including the node, wherein the weighting factor corresponds to a result of the search-related step,
wherein greater weighting is given to one of an incomplete transaction and an incomplete search in comparison to one of a finished transaction and a finished search; and
program instructions to output the search tree as a part of a search journal corresponding to the session,
wherein the search tree maintains a virtual relationship to a container within the information system without requiring actual references to be created and maintained.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to detect initiating a session with an information system, the session including a search for a data item in the information system;
program instructions to construct, in an application executing using a processor and a memory, a node in a search tree, the node representing a search-related step occurring in the session;
program instructions to configure the node with at least a search term used in the search and a context within which the search is performed using the search term:
program instructions to position the node relative to a second node in the search tree responsive to a temporal ordering information corresponding to the search, wherein the second node corresponds to a second search that was performed in the session and prior to the search in the session;
program instructions to weight, using a weighting factor, a portion of the search tree including the node, wherein the weighting factor corresponds to a result of the search-related step,
wherein greater weighting is given to one of an incomplete transaction and an incomplete search in comparison to one of a finished transaction and a finished search; and
program instructions to output the search tree as part of a search journal corresponding to the session,
wherein the search tree maintains a virtual relationship to a container within the information system without requiring actual references to be created and maintained.

* * * * *